United States Patent
Delord et al.

(10) Patent No.: US 10,046,808 B2
(45) Date of Patent: Aug. 14, 2018

(54) DEVICE FOR ATTACHING A CROSS-MEMBER OF A DRIVER'S COMPARTMENT OF A MOTOR VEHICLE

(71) Applicant: RENAULT, Boulogne Billancourt (FR)

(72) Inventors: Christian Delord, Pavillon Sous Bois (FR); Jerome Caillard, Gif sur Yvette (FR); Thierry Hlubina, Chaville (FR)

(73) Assignee: RENAULT s.a.s., Boulogne Billancourt (FR)

( * ) Notice: Subject to any disclaimer, the term of this patent is extended or adjusted under 35 U.S.C. 154(b) by 215 days.

(21) Appl. No.: 15/027,926

(22) PCT Filed: Sep. 12, 2014

(86) PCT No.: PCT/FR2014/052277
§ 371 (c)(1),
(2) Date: May 19, 2016

(87) PCT Pub. No.: WO2015/052391
PCT Pub. Date: Apr. 16, 2015

(65) Prior Publication Data
US 2016/0251037 A1    Sep. 1, 2016

(30) Foreign Application Priority Data

Oct. 11, 2013 (FR) ..................... 13 59909

(51) Int. Cl.
*B62D 25/14* (2006.01)
*B62D 27/02* (2006.01)

(52) U.S. Cl.
CPC ......... *B62D 25/145* (2013.01); *B62D 27/023* (2013.01)

(58) Field of Classification Search
CPC ... B62D 25/145; B62D 25/147; B62D 27/023
(Continued)

(56) References Cited

U.S. PATENT DOCUMENTS 2,470,919 A * 5/1949 Cole ................ B62D 27/023
296/35.1
2,843,231 A * 7/1958 Maruhn ................ B62D 21/02
280/800

(Continued)

FOREIGN PATENT DOCUMENTS

FR    2 951 688 A1    4/2001

OTHER PUBLICATIONS

Written opinion translation (dated 2013).*
(Continued)

*Primary Examiner* — Hilary L Gutman
(74) *Attorney, Agent, or Firm* — Oblon, McClelland, Maier & Neustadt, L.L.P.

(57) ABSTRACT

The invention relates to a device for attaching an end of a cross-member of a driver's compartment of a motor vehicle to the assembled shell, which includes an attachment element provided with a first surface, for receiving the cross-member of a driver's compartment, and with a second surface opposite the first surface. Said device comprises first and second reinforcements extending from the second surface and each including: a base connected to the attachment element and to be attached to a portion of the vehicle, two side walls extending from the base and connected to the attachment element.

17 Claims, 4 Drawing Sheets

Figure 1:
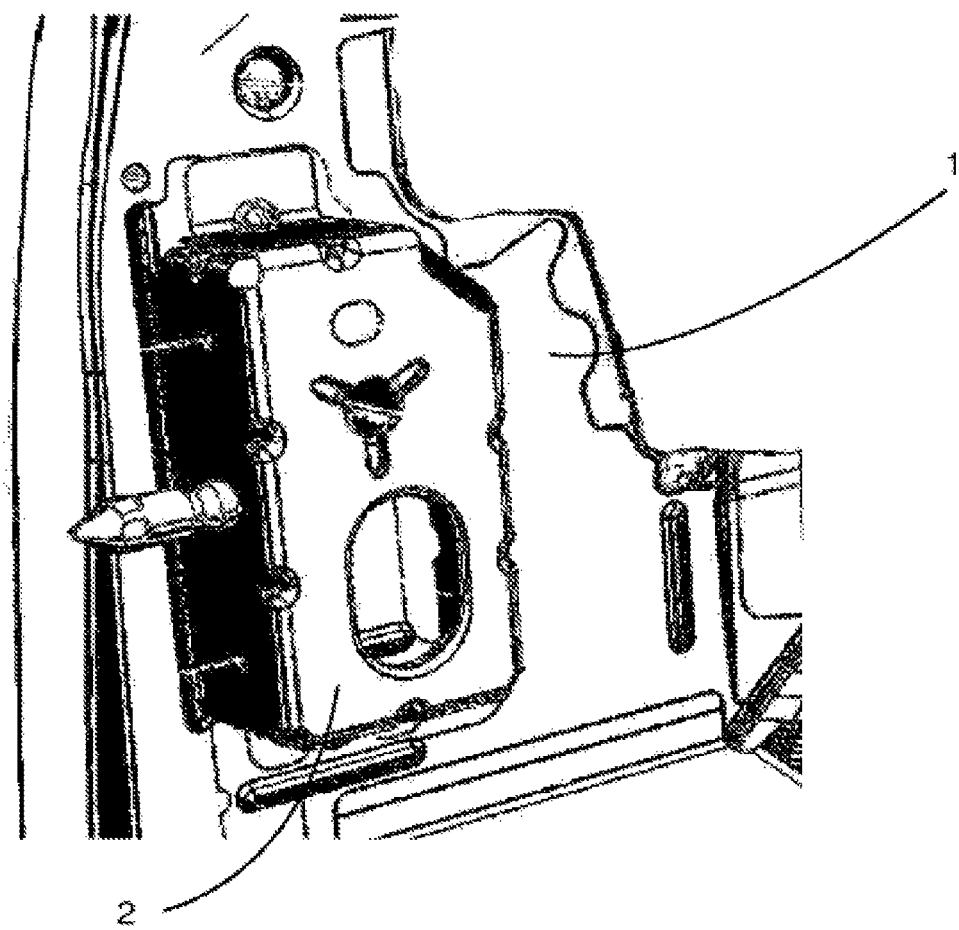

(58) Field of Classification Search
USPC .................................................. 296/193.05
See application file for complete search history.

(56) References Cited

U.S. PATENT DOCUMENTS

| | | | | |
|---|---|---|---|---|
| 2,978,055 A * | 4/1961 | Barenyi | ..................... | B60J 1/02 |
| | | | | 180/78 |
| 5,387,023 A * | 2/1995 | Deneau | ................. | B60K 37/00 |
| | | | | 296/187.12 |
| 5,931,520 A * | 8/1999 | Seksaria | ............... | B60R 21/045 |
| | | | | 280/752 |
| 6,382,695 B1 * | 5/2002 | Decome | ............... | B62D 25/145 |
| | | | | 256/72 |
| 9,452,783 B1 * | 9/2016 | Saje | ...................... | B62D 21/152 |
| 9,771,107 B2 * | 9/2017 | Brancheriau | ........ | B62D 25/147 |
| 2002/0008399 A1 * | 1/2002 | Yasuta | ................. | B60H 1/0055 |
| | | | | 296/72 |
| 2002/0145309 A1 * | 10/2002 | Shikata | .............. | B60H 1/00528 |
| | | | | 296/208 |
| 2002/0157234 A1 * | 10/2002 | Sawada | ............... | B62D 25/145 |
| | | | | 29/464 |
| 2002/0167199 A1 * | 11/2002 | Kim | ..................... | B62D 25/145 |
| | | | | 296/203.02 |
| 2004/0262954 A1 * | 12/2004 | Scheib | ................ | B62D 25/142 |
| | | | | 296/193.02 |
| 2009/0039668 A1 * | 2/2009 | Baudart | ............... | B62D 25/147 |
| | | | | 296/72 |
| 2010/0032228 A1 | 2/2010 | Merkle et al. | | |
| 2010/0176262 A1 * | 7/2010 | Vican | ................... | B62D 25/147 |
| | | | | 248/250 |
| 2010/0187800 A1 * | 7/2010 | Chen | .................... | B62D 23/005 |
| | | | | 280/785 |
| 2010/0289296 A1 * | 11/2010 | Brancheriau | ........ | B62D 25/147 |
| | | | | 296/193.02 |
| 2012/0049574 A1 * | 3/2012 | Atsumi | ................ | B62D 25/145 |
| | | | | 296/193.02 |
| 2013/0043703 A1 * | 2/2013 | Whipps | .................. | B62D 25/04 |
| | | | | 296/193.06 |
| 2013/0076016 A1 * | 3/2013 | Aoki | ....................... | B62D 1/16 |
| | | | | 280/779 |
| 2013/0154300 A1 * | 6/2013 | Arzoumanian | ...... | B62D 25/145 |
| | | | | 296/72 |
| 2013/0181482 A1 * | 7/2013 | Suzaki | ................ | B62D 25/081 |
| | | | | 296/192 |
| 2013/0312242 A1 * | 11/2013 | Tamagawa | ........... | B62D 25/147 |
| | | | | 29/464 |
| 2014/0138980 A1 * | 5/2014 | Baudart | ............... | B62D 25/145 |
| | | | | 296/72 |
| 2014/0217780 A1 * | 8/2014 | Vican | ................... | B62D 25/147 |
| | | | | 296/193.02 |
| 2015/0145237 A1 * | 5/2015 | Morita | ................. | B62D 25/145 |
| | | | | 280/779 |
| 2015/0291221 A1 * | 10/2015 | De Almeida | ........ | B62D 25/147 |
| | | | | 296/193.02 |
| 2015/0375793 A1 * | 12/2015 | Donabedian | .......... | B62D 21/02 |
| | | | | 296/187.09 |
| 2016/0052562 A1 * | 2/2016 | Yoshida | ................ | B62D 25/14 |
| | | | | 296/72 |
| 2016/0214650 A1 * | 7/2016 | Ideguchi | .............. | B62D 25/145 |

OTHER PUBLICATIONS

International Search Report dated Dec. 9, 2014, in PCT/FR2014/052277 Filed Sep. 12, 2014.
French Search Report dated Jun. 3, 2014 in FR 13 59909 Filed Oct. 11, 2013.

* cited by examiner

DEVICE FOR ATTACHING A CROSS-MEMBER OF A DRIVER'S COMPARTMENT OF A MOTOR VEHICLE

TECHNICAL FIELD OF THE INVENTION

The invention relates to the domain of motor vehicles.

The invention relates more specifically to a device for attaching an extremity of a driver's compartment cross member of a motor vehicle to the assembled body, said device including an attachment element provided with a first face designed to receive the driver's compartment cross member and with a second face opposite the first face.

PRIOR ART

In the domain of motor vehicles, a structure such as the one illustrated in FIG. 1 is known, comprising a vehicle A-pillar inner panel 1 to which is attached a device 2 for attaching a driver's compartment cross member (not shown). This attachment device 2 is a housing forming an open or closed hollow body when attached to the A-pillar inner panel 1. This design has a relatively significant mass. Furthermore, attachment of a driver's compartment front cross member normally requires two differently shaped attachment devices (one for each side), which in turn requires referencing work, additional stock for after-sales service, etc.

This makes it difficult to optimize the structure, in particular in terms of mass, while preferably satisfying specific criteria relating to quality, manufacturing costs, production lead times and consequently production improvements.

To overcome these issues, it is proposed to build the attachment device into the A-pillar inner panel. In this case, the attachment device is formed by stamping in a particular zone of the A-pillar inner panel. However, this type of solution cannot be applied to all vehicle types.

PURPOSE OF THE INVENTION

The objective of the present invention is to propose a solution that overcomes some or all of the drawbacks listed above.

Achievement of this objective is facilitated by the fact that the device comprises first and second reinforcements extending from the second face and each including a base that is connected to the attachment element and that is designed to be attached to a portion of the vehicle, and two side walls that extend from the base and that are connected to the attachment element.

Preferably, the first and second reinforcements are arranged at the longitudinal extremities of the attachment element.

According to one embodiment, at least one of the side walls of each of the first and second reinforcements is attached to the second face of the attachment element, in particular by a weld seam.

For example, the attachment element includes two fins extending from the second face, and one of the side walls of each of the first and second reinforcements is attached to the corresponding one of said fins, in particular by means of a spot weld.

According to one embodiment, the device includes a first member for attaching the driver's compartment cross member to the attachment element formed at the first reinforcement and a second member for attaching the driver's compartment cross member formed at the second reinforcement.

According to a specific example, the section of each of the first and second reinforcements is defined, in a plane perpendicular to the direction in which said first and second reinforcements extend, by an open line having an overall "U" shape.

Advantageously, the device includes a plane of symmetry perpendicular to the attachment element that passes between the first and second reinforcements.

According to a preferred embodiment, the base is formed as a single piece with the attachment element by bending, and the two side walls are formed as a single piece with the base by bending.

The invention also relates to an arrangement for a motor vehicle including an attachment device, in which the first and second reinforcements extend from the attachment element towards the front of the vehicle, a portion of the vehicle on which the attachment device is mounted, and a driver's compartment cross member attached to the attachment device.

Preferably, the vehicle portion is a right-side or left-side A-pillar inner panel, and at least one of the first and second reinforcements, in particular at the base thereof, is attached, notably by welding, to an internal face of said A-pillar inner panel oriented towards the inside of the vehicle.

The arrangement may also include an external element designed to engage with an element for transmitting force from the A-pillar to a front door of the vehicle if the vehicle suffers a frontal impact, said external element being attached, in particular by welding, to an external face of said A-pillar inner panel oriented towards the outside of the vehicle.

Preferably, the external element has two partitions extending from the external face of the A-pillar inner panel and that are arranged such as to enable transmission of a transverse force applied to the vehicle between the driver's compartment cross member and said external element if the vehicle suffers a frontal impact. The two partitions may be aligned respectively with one of the side walls of said first reinforcement and one of the side walls of said second reinforcement.

Furthermore, the A-pillar inner panel includes a slot enabling the passage of a wing of the external element attached, in particular by welding, to the first face of the attachment device.

The invention also relates to a motor vehicle having an arrangement such as the one described.

SHORT DESCRIPTION OF THE DRAWINGS

Figure 2:
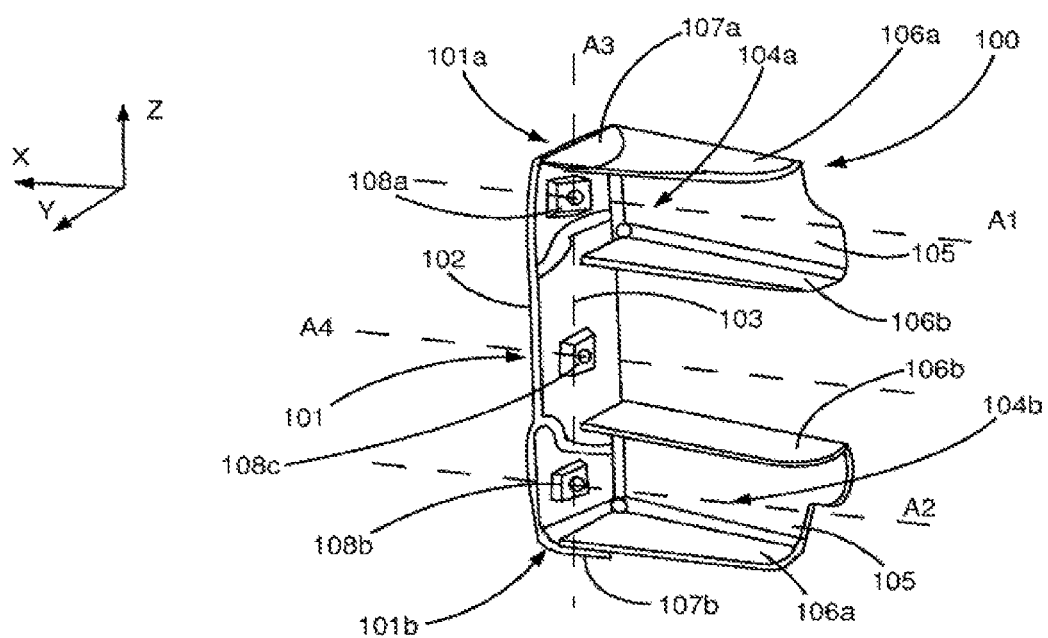
Figure 3:
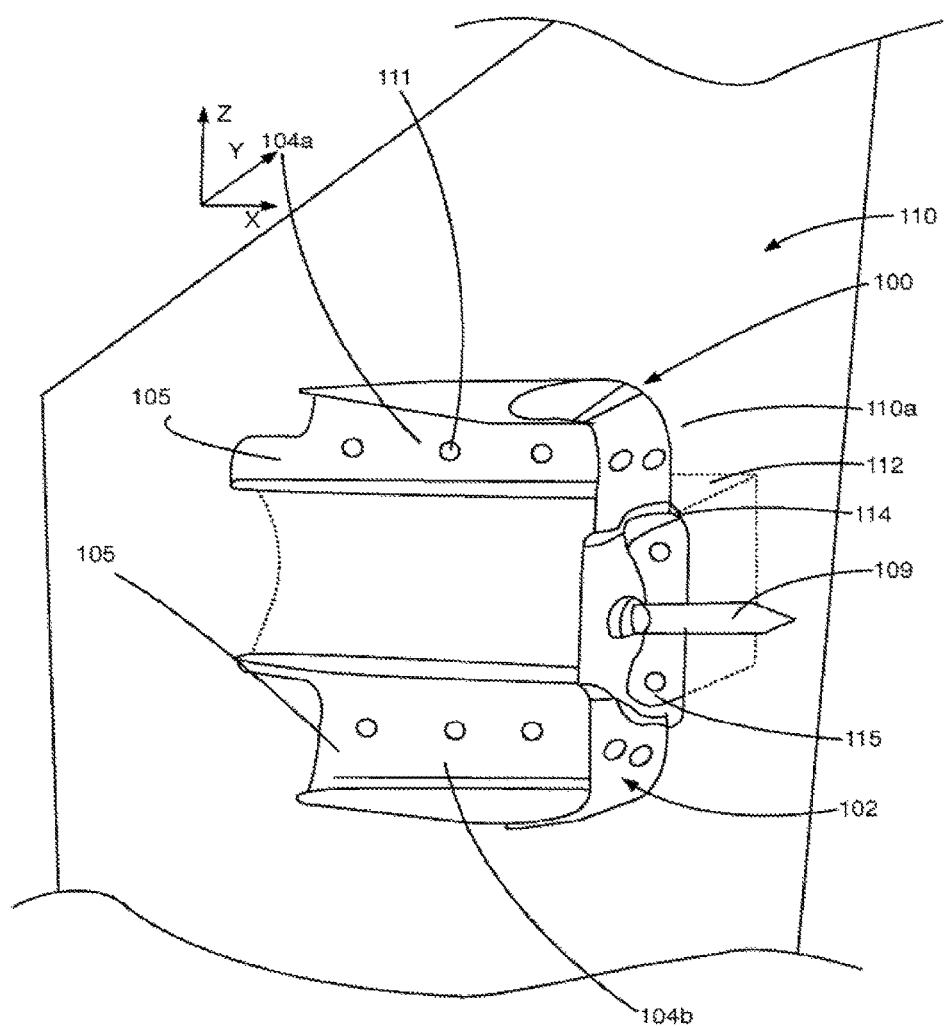
Figure 4:
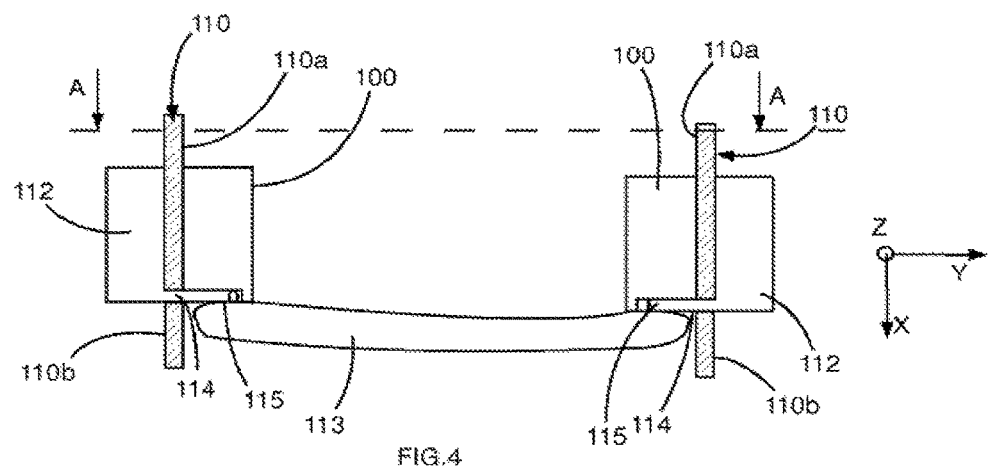
Figure 5:
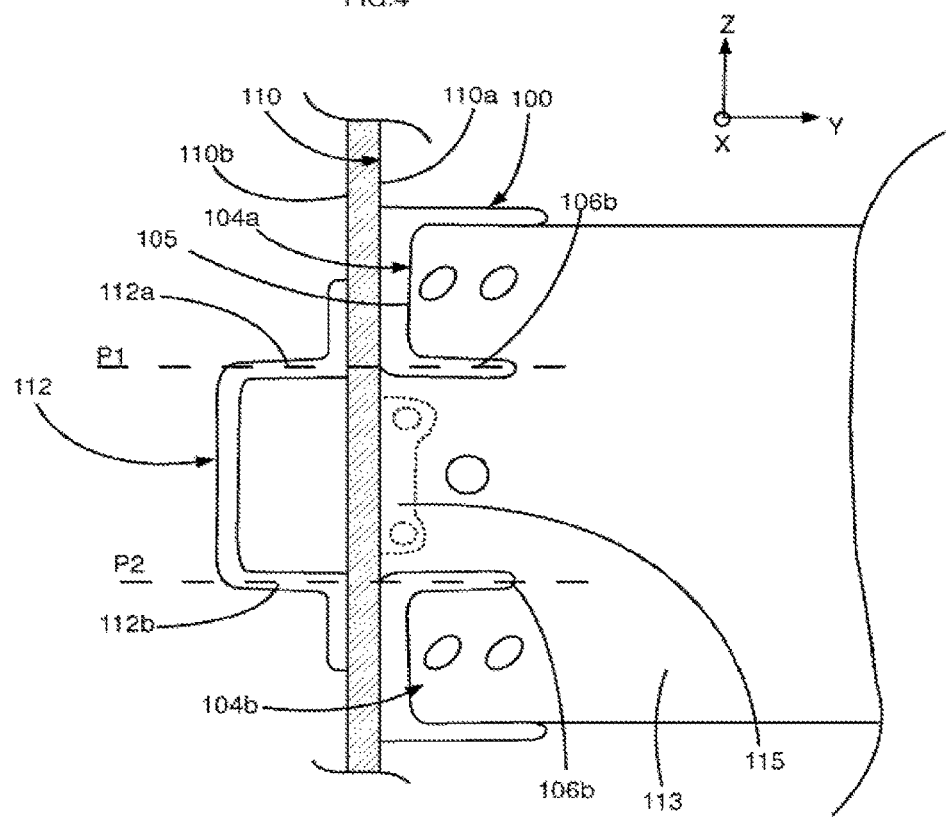

Other advantages and features are set out more clearly in the description given below of specific embodiments of the invention, which are provided as nonlimiting examples and are shown on the attached drawings, in which:

FIG. 1 is a perspective view of an attachment device mounted on an A-pillar inner panel according to the prior art, FIG. 2 is a perspective view of an attachment device according to one embodiment of the invention, FIG. 3 shows the attachment device in FIG. 2 mounted on an A-pillar inner panel, FIG. 4 is a top view of an arrangement according to one embodiment of the invention, FIG. 5 is a cross-sectional view along A-A in FIG. 4 centered on one of the attachment devices.

DESCRIPTION OF PREFERRED EMBODIMENTS OF THE INVENTION

The following definitions apply to the description below.

By definition, in the present description, the axis X is a longitudinal axis of the vehicle passing through the front and through the rear of the vehicle. The axis Y is transversal to the vehicle and perpendicular to the axis X. The reference XY represents a horizontal plane of the vehicle when it is resting on its wheels on horizontal ground. The axis Z is perpendicular to the axes X and Y and is a vertical axis of the vehicle. The axes Y, X and Z are used in the different figures to represent an advantageous positioning of the different motor vehicle elements shown.

"Driver's compartment cross member" shall in general mean an elongate element extending along the axis Y and assembled such as to be mounted on the two A-pillar inner panels, respectively on the left-hand side and the right-hand side of the motor vehicle using two attachment devices. The driver's compartment cross member is in particular designed to hold said driver's compartment (dashboard, steering column, glove box). It is usually parallel to the windshield cross member arranged at the interface with the front windshield of the vehicle. Furthermore, it strengthens the driver's compartment zone and serves as an anchor point for the steering column, the steering wheel and in particular the passive safety devices (for example air bags).

"A-pillar inner panel" shall in general mean a structural element of the vehicle on which a wing of the vehicle and a window post of the windshield can be mounted, closing the hollow body in front of the front doorway.

The attachment device described below in particular enables one extremity of the driver's compartment cross member to be attached to one of the A-pillar inner panels, and differs notably from those found in the prior art in that it includes reinforcements formed by two distinct cavities.

In FIG. 2, the device 100 for attaching an extremity of a driver's compartment cross member of a motor vehicle to the assembled body, includes an attachment element 101 provided with a first face 102 designed to receive the driver's compartment cross member and to act as a reference and a guide for the driver's compartment cross member and with a second face 103 opposite the first face 102. Furthermore, the attachment device has first and second reinforcements 104a, 104b extending from the second face 103, and in particular coming from the same part.

Preferably, these first and second reinforcements 104a, 104b form two distinct cavities with the attachment element 101. These two cavities extend perpendicular to the second face 103 along the axes marked respectively A1 and A2 in FIG. 2 and serve as stays for this part.

The use of such an attachment device makes it possible to perform the same functions as the attachment device in FIG. 1, but using less material, and preferably in a single part. The reduction in mass is estimated to be between 0.5 kg and 0.8 kg.

Preferably, the first and second reinforcements are arranged at the longitudinal extremities 101a, 101b of the attachment element 101. The attachment element 101 extends along the axis A3, preferably parallel to the axis Z (or X in another embodiment) when the attachment device is assembled in a motor vehicle, enabling the part to be welded to itself.

Advantageously, the first and second reinforcements 104a, 104b each have a base 105 linked to the attachment element 101 and designed to be attached to a portion of the vehicle. In particular, the base 105 is formed as a single part with the attachment element by bending, i.e. bending two portions of the initial part in relation to another portion of said part enables the two bases to be positioned. Furthermore, each of the first and second reinforcements 104a, 104b also includes two side walls 106a, 106b extending from the base 105, and in particular formed as a single part with the base by bending, and linked to the attachment element 101. This specific structure, in particular the bends in same, makes the attachment element very strong.

According to a first specific embodiment, at least one (or both) of the side walls 106a, 106b of each of the first and second reinforcements 104a, 104b is attached to the second face 103 of the attachment element 101, in particular by a weld seam. Preferably, as shown in FIG. 2, one of the side walls 106b of the first reinforcement 104a and one of the side walls 106b of the second reinforcement 104b that is adjacent/close to said one of the side walls 106b of the first reinforcement 104a, are attached to the second face 103 of the attachment element 101, in particular by one or more weld seams.

According to a second specific embodiment that may be combined with the first specific embodiment, the attachment element 101 includes two fins 107a, 107b extending from the second face 103, and at least one of the side walls of each of the first and second reinforcements is attached to the corresponding one of said fins 107a, 107b, in particular by means of a spot weld. In particular, the fins 107a, 107b are formed as a single part with the rest of the attachment element 101 by bending. In other words, bending the attachment element 101, in particular at the longitudinal extremities 101a, 101b of same, enables said fins 107a, 107b to be formed.

Preferably, the section of each of the first and second reinforcements 104a, 104b is defined, in a plane perpendicular to the direction in which said first and second reinforcements 104a, 104b extend, by an open line having an overall "U" shape. This makes it possible to enhance the reinforcement while limiting the mass of the attachment device.

It can be understood from the foregoing that the extremity of the driver's compartment cross member is attached to the attachment element. In this regard, the attachment device 100 includes a first member 108a for attaching the driver's compartment cross member to the attachment element 101 formed at the first reinforcement 104a and a second member 108b for attaching the driver's compartment cross member formed at the second reinforcement 104b. Preferably, the side walls of each of the reinforcements are within respectively first and second mutually parallel planes and the attachment element arranged on the first corresponding reinforcement is within a third plane parallel to the first and second planes and arranged between said first and second planes.

Furthermore, the attachment device 100 may include a third member 108c for attaching the driver's compartment cross member to the attachment element 101 formed between the first and second reinforcements 108a, 108b. This third attachment member 108c may include a guide pin 109, as shown in FIG. 3, that is designed to pass through or penetrate a corresponding opening in the driver's compartment cross member.

Advantageously, the attachment device includes a plane of symmetry perpendicular to the attachment element 101 that passes between the first and second reinforcements 104a, 104b. It can be seen in FIG. 2 that this axis of symmetry includes the axis A4. This symmetry is advantageous in that the attachment device can consequently be used both for a right-hand and a left-hand attachment of the driver's compartment cross member. This reduces referencing requirements for different parts. Furthermore, a single tool can then be used to handle the left-hand and right-hand attachment devices on a production line. This reduces the manufacturing costs and tool-depreciation costs on the production line.

The invention also relates to a method for manufacturing an attachment device as described. Such a method may include a step for supplying a plate bearing the first, second and third portions designed to form respectively the first and second reinforcements and the attachment element by bending the plate. In particular, the method may include a step for bending the first portion of the plate and the second portion of the plate in relation to the third portion of the plate such that, after the third portion of the plate has been bent, it forms the attachment element from which the bases of the first and second reinforcements extend. Another step for bending the first and second portions enables the side walls of each of the reinforcements to be delimited. The method may also include a welding step enabling the different welds mentioned above to be made, in particular a welding step for each of the side walls to the third portion forming the attachment element.

The invention also relates to an arrangement for a motor vehicle as illustrated by way of example in FIGS. 3 to 5. Such an arrangement includes an attachment device 100 as described, in which the first and second reinforcements 104a, 104b extend from the attachment element 101 towards the front of the vehicle (i.e. along the axis X), the vehicle portion 110 on which the attachment device 100 is mounted, and a driver's compartment cross member 113 attached to the attachment device 100.

Preferably, the vehicle portion 110 is a right-side or left-side A-pillar inner panel, and at least one of the first and second reinforcements 104a, 104b, in particular at the base 105 thereof, is attached, notably by welding (in particular using spot welds 111), to the internal face 110a of said A-pillar inner panel 110 oriented towards the inside of the vehicle.

According to a specific embodiment, the arrangement includes an external element 112 designed to engage with an element for transmitting force from the A-pillar to the front door (not shown) of the vehicle if the vehicle suffers a frontal impact, said external element 112 being attached, in particular by welding, to an external face 110b of said A-pillar inner panel 110 oriented towards the outside of the vehicle. The external element 112 is also referred to in this domain as an anti-burst housing or pin. Indeed, it is designed to engage with a corresponding portion of a front door of the vehicle if the vehicle suffers a frontal impact. Without this external element, if the frontal impact is hard enough, the structure of the vehicle is subjected to a compressive force that may result in detachment of the hinged door level with the corresponding A-pillar inner panel. In this regard, the engagement obviates the detachment of the door by controlling the deformation of same, which results in the loss of a force path and a restriction of the door entry zone that can result in excessive deformation of the survival cell and inability to open the door after impact. The portion of the door designed to engage with the external element is usually the door panel reinforcement arranged parallel to the axis X at the interface between the scuff plate and an aperture in the door designed to be glazed.

Preferably, the external element 112 has two partitions 112a, 112b (FIG. 5) extending from the external face of the A-pillar inner panel 110 and that are arranged such as to enable transmission of a transverse force applied to the vehicle between the driver's compartment cross member 113 and said external element 112 if the vehicle suffers a frontal impact. To perform this force-transmission function, the two partitions 112a, 112b are preferably aligned respectively with one of the side walls of said first reinforcement 104a and one of the side walls of said second reinforcement 104a. Advantageously, as shown in FIG. 5, the two partitions 112a, 112b are aligned respectively with one of the side walls 106b of the first reinforcement 104a and one of the side walls 106b of the second reinforcement 104b adjacent/close to said one of the side walls 106b of the first reinforcement 104a. In other words, in the specific example shown in FIG. 5, one of the partitions 112a is within a plane P1 (perpendicular to the plane in FIG. 5) that also includes the side wall 106b of the first reinforcement 104a, and the other partition 112b is within a plane P2 (perpendicular to the plane in FIG. 5) that also includes the side wall 106b of the second reinforcement 104b. The use of the side walls 106b close to the first and second reinforcements to enable a force transfer along the axis Y between the driver's compartment cross member 113 and the external element 112 if the vehicle suffers a frontal impact also helps to reduce the mass of the external element 112 in relation to the prior art. Indeed, in the prior art, the partitions 112a, 112b of the external element had to be aligned with the side walls of the attachment device in FIG. 1. Consequently, the present invention results in a significant weight saving of between 0.1 kg and 0.2 kg in relation to the prior art, while performing a similar function.

According to an improvement, the A-pillar inner panel 110 includes a slot 114 (FIG. 4) enabling the passage of a wing 115 of the external element 112 attached, in particular by welding, to the first face 102 of the attachment device 100. This helps to improve force distribution along Y to prevent the detachment of the front door engaged with the external element 112 in the event of a sufficiently hard frontal impact.

The description of the arrangement only covers an A-pillar inner panel in detail. Naturally, the arrangement may include two attachment devices 100 attached firstly to one corresponding extremity of the driver's compartment cross member 113 and secondly to an A-pillar inner panel 110, as shown in FIG. 4. In this regard, everything described in relation to an attachment device can be extended at each extremity of the driver's compartment cross member 113 on account of the symmetry of the structure of the vehicle about the mid axis of the vehicle parallel to the axis X.

The invention naturally also relates to a motor vehicle having an arrangement such as the one described.

Preferably, the attachment device is made from a metal part.

The invention claimed is:

1. A device for attaching an extremity of a driver's compartment cross member of a motor vehicle to an assembled body, said device comprising:
   an attachment element including a first face designed to receive the driver's compartment cross member, and a second face opposite the first face, and two fins; and
   a first reinforcement and a second reinforcement both extending from the second face, the first and second reinforcements each including a base connected to the attachment element and designed to be attached to a portion of the vehicle, and two side walls extending from the base and connected to the attachment element, wherein the two fins extend from the second face and one of the two side walls of each of the first and second reinforcements is attached to the corresponding one of said fins by a spot weld.

2. The device as claimed in claim 1, wherein the base is formed as a single piece with the attachment element by bending, and the two side walls are formed as a single piece with the base by bending.

3. The device as claimed in claim 1, wherein the first and second reinforcements are arranged at the longitudinal extremities of the attachment element.

4. The device as claimed in claim 1, wherein at least one of the two side walls of each of the first and second reinforcements is attached to the second face of the attachment element by a weld seam.

5. The device as claimed in claim 1, further comprising a first member for attaching the driver's compartment cross member to the attachment element formed at the first reinforcement and a second member for attaching the driver's compartment cross member formed at the second reinforcement.

6. The device as claimed in claim 1, wherein a section of each of the first and second reinforcements is defined, in a plane perpendicular to a direction said first and second reinforcements extend by an open line having a "U" shape.

7. The device as claimed in claim 1 further comprising a plane of symmetry perpendicular to the attachment element that passes between the first and second reinforcements.

8. An arrangement for the motor vehicle including the attachment device as claimed in claim 1, wherein the first and second reinforcements extend from the attachment element towards the front of the motor vehicle, the attachment device is mounted on a portion of the motor vehicle, and the driver's compartment cross member is attached to the attachment device.

9. The arrangement as claimed in claim 8, wherein the portion of the motor vehicle is a right-side or left-side A-pillar inner panel, and at least one of the first and second reinforcements is welded to an internal face of said A-pillar inner panel oriented towards an inside of the motor vehicle.

10. The arrangement as claimed in claim 9, further comprising an external element welded to an external face of said A-pillar inner panel oriented towards an outside of the motor vehicle.

11. The arrangement as claimed in claim 10, wherein the external element has two partitions extending from the external face of the A-pillar inner panel and arranged such as to enable transmission of a transverse force applied to the motor vehicle between the driver's compartment cross member and said external element if the vehicle suffers a frontal impact.

12. The arrangement as claimed in claim 11, wherein the two partitions are aligned respectively with one of the two side walls of said first reinforcement and one of the two side walls of said second reinforcement.

13. The arrangement as claimed in claim 9, wherein the A-pillar inner panel includes a slot enabling a passage of a wing of the external element welded to the first face of the attachment device.

14. A motor vehicle comprising:
the arrangement as claimed in claim 8.

15. The device as claimed in claim 1, wherein the attachment device is a metal part.

16. An arrangement for the motor vehicle comprising:
an attachment device, the attachment device including an attachment element, a first reinforcement, and a second reinforcement; and
an external element,
wherein the attachment element including a first face, a second face opposite the first face, and two fins,
wherein the first and second reinforcements extending from the attachment element towards a front of the motor vehicle, the attachment device is mounted on a portion of the motor vehicle, and a driver's compartment cross member is attached to the attachment device,
wherein the portion of the motor vehicle being a right-side or left-side A-pillar inner panel, and at least one of the first and second reinforcements being welded to an internal face of said A-pillar inner panel oriented towards an inside of the motor vehicle, and
wherein the external element being welded to an external face of said A-pillar inner panel oriented towards an outside of the motor vehicle, and the external element having two partitions extending from the external face of the A-pillar inner panel and being arranged to enable transmission of a transverse force applied to the motor vehicle between the driver's compartment cross member and said external element if the vehicle suffers a frontal impact.

17. An arrangement for the motor vehicle comprising:
an attachment device, the attachment device including an attachment element, a first reinforcement, and a second reinforcement; and
an external element,
wherein the attachment element including a first face, a second face opposite the first face, and two fins,
wherein the first and second reinforcements extending from the attachment element towards a front of the motor vehicle, the attachment device is mounted on a portion of the motor vehicle, and a driver's compartment cross member is attached to the attachment device,
wherein the portion of the motor vehicle being a right-side or left-side A-pillar inner panel, and at least one of the first and second reinforcements being welded to an internal face of said A-pillar inner panel oriented towards an inside of the motor vehicle, and
wherein said A-pillar inner panel including a slot enabling a passage of a wing of the external element welded to the first face of the attachment device.

* * * * *

UNITED STATES PATENT AND TRADEMARK OFFICE
CERTIFICATE OF CORRECTION

PATENT NO. : 10,046,808 B2
APPLICATION NO. : 15/027926
DATED : August 14, 2018
INVENTOR(S) : Christian Delord et al.

Page 1 of 1

It is certified that error appears in the above-identified patent and that said Letters Patent is hereby corrected as shown below:

On the Title Page

Item (71) the Applicant's information is incorrect. Item (71) should read:
--(71) Applicant: Renault s.a.s., Boulogne Billancourt (FR)--

Signed and Sealed this
Twenty-eighth Day of May, 2019

Andrei Iancu
*Director of the United States Patent and Trademark Office*